United States Patent [19]

Tamaki et al.

[11] Patent Number: 4,744,072
[45] Date of Patent: May 10, 1988

[54] RECORDED SIGNAL REPRODUCING OR PLAYBACK APPARATUS

[75] Inventors: Shinichi Tamaki; Hideyuki Takahashi, both of Saitama, Japan

[73] Assignee: Pioneer Electronic Corporation, Tokyo, Japan

[21] Appl. No.: 367,516

[22] Filed: Apr. 12, 1982

[30] Foreign Application Priority Data

Apr. 14, 1981 [JP] Japan ............................ 56-54200[U]

[51] Int. Cl.⁴ ............................................ G11B 17/04
[52] U.S. Cl. .................................... 369/75.2; 369/270
[58] Field of Search ................... 309/75, 77, 79, 270, 309/271

[56] References Cited

U.S. PATENT DOCUMENTS

| | | | |
|---|---|---|---|
| 2,489,146 | 11/1949 | Louchheim | 369/77.1 |
| 2,939,713 | 6/1960 | Winter | 369/77.1 |
| 4,040,107 | 8/1977 | Bryer | 369/77.2 |

FOREIGN PATENT DOCUMENTS

| | | | |
|---|---|---|---|
| 724985 | 1/1966 | Canada | 369/75.2 |
| 3116056 | 3/1982 | Fed. Rep. of Germany | 369/75.2 |
| 2407543 | 5/1979 | France | 369/75.1 |
| 4410424 | 3/1966 | Japan | 369/75.2 |
| 2088615 | 6/1982 | United Kingdom | 369/75.2 |

*Primary Examiner*—Steven L. Stephan
*Attorney, Agent, or Firm*—Sughrue, Mion, Zinn, Macpeak & Seas

[57] ABSTRACT

A playback apparatus for use with disc media includes a disc clamping mechanism operable with the opening and closing of the disc holding device with respect to the body of the playback apparatus. Portions of the clamper are normally spring biased to an open or non-clamping state, and are moved by a cam to the clamping position when the holding device is closed.

6 Claims, 2 Drawing Sheets

RECORDED SIGNAL REPRODUCING OR PLAYBACK APPARATUS

BACKGROUND OF THE INVENTION

The present invention relates to a signal reproducing or playback apparatus in which a disc like recording medium (hereinafter referred to as a disc) is mounted on a setting base and signal reproduction or playback is carried out, and it relates, more particularly, to a signal reproducing apparatus in which disc loading/unloading is readily attained.

According to the prior art, it is very troublesome to set the disc on a setting base in a signal reproducing apparatus in which the disc is loaded vertically during reproduction, for example, because the disc is loaded on the setting base while being pressed by one hand of the user and being fixed with a clamper by the other hand.

SUMMARY OF THE INVENTION

The present invention is characterized in that the operation of the clamper is carried out in association with the operation of the holder in which the disc is received and the loading/unloading of the disc is attained in accordance with the opening/closing operation of the holder.

BRIEF DESCRIPTION OF THE DRAWINGS

One embodiment of the present invention will now be described in detail with reference to the accompanying drawings, in which.

DETAILED DESCRIPTION OF THE PREFERRED EMBODIMENT

Figure 1:
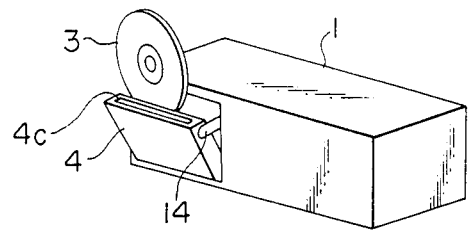
FIG. 1 is a perspective view showing one embodiment of the present invention.
Figure 2:
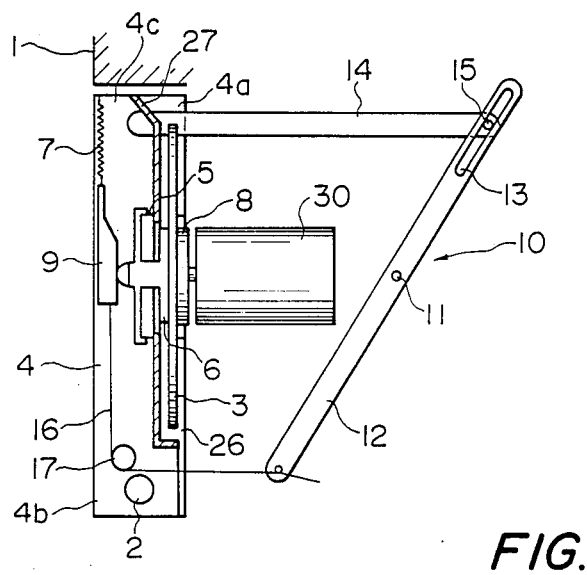
FIGS. 2 to 4 show the construction of the embodiment of the present invention, FIG. 2 showing the state in which the holder is closed, FIG. 3 showing the state in which the holder is opened, and FIG. 4 showing a cross section of the clamper portion; and, FIG. 5 is an illustration of another embodiment of the present invention.
Figure 3:
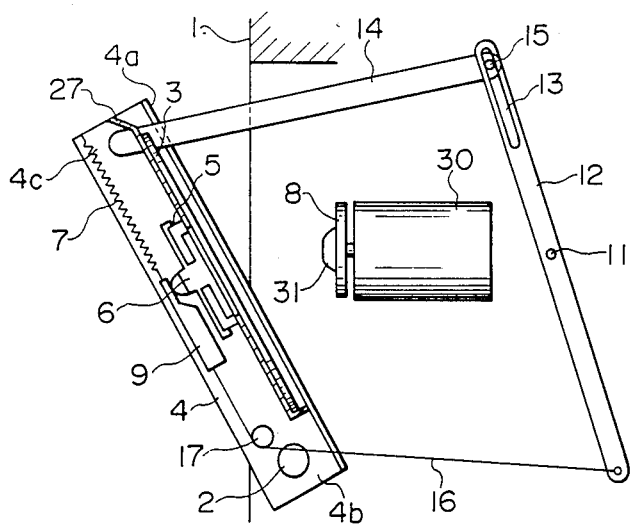

The signal reproducing apparatus in accordance with the present invention, as shown in FIGS. 1 to 3, comprises a holder 4 which is received or retractable within a body 1 of the signal reproducing apparatus and is opened and closed about pins 2 provided at a lower end thereof, and in which a disc 3 is received; a clamper 6 biased by a first spring member 5 (a coil spring in this embodiment) in a direction remote from the disc encased in the holder 4; a cam 9 biased by a second spring member 7 to press the disc 3 toward a setting base 8; and a lock releasing member 10, one end of which is coupled to a free end 4a of the holder 4 and the other end of which is coupled through a fixed end 4b of the holder 4 to an end of the cam 9 opposite the end at which the second spring member 7 is mounted.

A specific example of the lock releasing member 10 is shown in FIGS. 2 and 3. Namely, a pin 15 formed on one end of a link 14 is engaged with a slit 13 on the side of a link 12, which is supported rotatably on a pin 11 to the body 1, and the other end of the link 14 is rotatably coupled to the free end 4a of the holder 4.

A wire 16 extending from the other end of the link 12 is laid around a roller 17 provided at the fixed end 4b of the holder 4 and is coupled to the end of the cam 9 opposite the second spring member 7.

Figure 4:
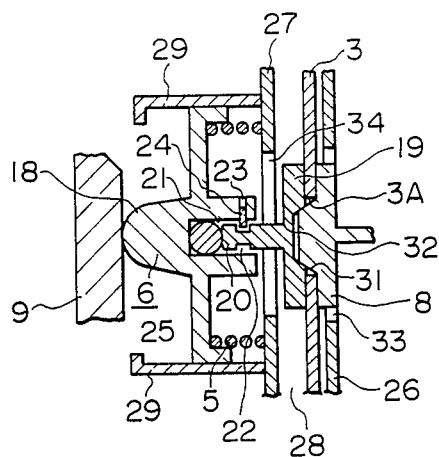

FIG. 4 is a cross-sectional view of a primary part of the clamper 6. The clamper 6 is composed of a first clamper member 18 and a second clamper member 19, a projection 20 of the second clamper member 19 being loosely engaged with a hole 21 formed at a center of the first clamper member 18.

Into a groove 22 formed in the projection 20 is inserted the tip end of a screw 24 threadedly engaged with a hole 23 of the first clamper member 18. Also, between the tip of the projection 20 and the bottom of the hole 21 is interposed a ball 25, so that the second clamper member 19 is rotatably supported with respect to the first clamper member 18.

Of course, the screw 24 may be replaced by other rotatable support means, such as a ball bearing or the like. A disc receiving portion 28 is constituted by an inside plate 26 of the holder 4 and a disc guide plate 27. A sliding plate 29 is fixed to the guide plate 27 so that the first clamper member 18 is slidably supported.

A centering portion 31 substantially in the form of a truncated cone is formed substantially at the center of the setting base 8, which is rotated by a motor 30 (FIG. 3) and is engaged with a center hole 3A of the disc 3 for centering. A recess 32 which is engaged with the centering portion 31 is formed substantially at the center of the disc contact surface of the second clamper portion 19.

A hole 33 is formed in the plate 26 in order to project the setting base 8 into the interior of the disc receiving portion 28 when the holder 4 is received in the body 1. A hole 34 is formed in the guide plate 27 in order to make the second clamper member 19 to project into the interior of the disc receiving portion 28.

In operation, when the holder 4 is opened from the body 1, the link 12 is rotated counterclockwise around the pin 11 by the link 14. As a result, the wire 16 is drawn in the right hand direction in FIG. 3 so that the cam 9 is moved downwardly against the force of the spring member 7.

Accordingly, by the spring member 5, the clamper 6 is moved slidingly on the sliding plate 29 in the leftward direction, so that the disc contact surface of the second clamper portion 19 is moved to a position where the portion 19 is substantially located at the same level as or over the surface of the guide plate 27 on the disc receiving side. Since at this time, the disc setting base 8 is also positioned outside of the disc receiving portion 28, the disc is readily unloaded from the disc receiving portion 28.

After the insertion of the disc into the disc receiving portion 28, when the holder 4 is closed with respect to the body 1, the link 12 is rotated clockwise about the pin 11 and the cam 9 is drawn upwardly by the spring member 7 so that the clamper 6 is pressed by the cam 9 and is projected into the interior of the disc receiving portion 28 against the force of the spring member 5 to thereby allow the disc 3 to be pressed toward the setting base 8.

Consequently, the disc 3 is engaged with the centering portion 31 at the center hole 3A and is clamped on the setting base 8.

When the motor 30 is rotated, the disc 3 is rotated together with the clamper portion 19.

Figure 5:
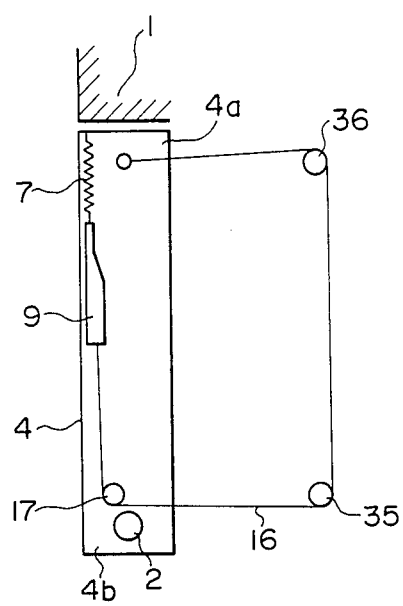

FIG. 5 shows another example of the lock releasing member 10, in which, instead of the links 12 and 14 shown in FIGS. 2 and 3, a wire 16 is laid around rollers 35 and 36 supported on the body 1. In this example, the same operation and effect as described before may be obtained.

Although the disc is loaded vertically in the above embodiments, the present invention is applicable to the case where the disc is mounted obliquely or horizontally.

As described above, according to the present invention, the disc receiving portion is formed in the holder which operates to open and close with respect to the body, and a clamper is provided so that the operational movement of the clamper is associated with the opening/closing operation of the holder. Therefore, the clamping and releasing operations are automatically achieved by simply opening and closing the holder and thus the loading/unloading of the disc may be readily carried out.

What is claimed is:

1. A signal reproducing apparatus for reproducing signals recorded on a disc, comprising:
   a body (1) of said apparatus;
   a holder (4) which is selectively opened or closed with respect to said body;
   a disc receiving portion (28) for receiving the disc, said portion being selectively opened or closed with respect to said body when said holder is opened or closed;
   a disc setting base (8) for rotating the disc, said setting base being retracted from and projected into said disc receiving portion in association with said opening and closing;
   clamper means (6) mounted on said holder for clamping the disc onto the disc setting base;
   first means comprising a spring member (5) for biasing said clamper means to move away from said disc receiving portion when said holder is opened; and
   second means comprising cam means (9) received in said holer, said cam means being mechanically linked to said holder and said body and being mechanically movable to a clamping position thereof by the closing of said holder for making said clamper means to project into said disc receiving portion when said holder is closed.

2. An apparatus as claimed in claim 1, further comprising means for linking said cam means with a free end (4a) of said holder, for moving said cam means to a non-clamping position thereof against a cam biasing force, upon opening of said holder and wherein said holder has said free end rotatable about a pivoting end (4b).

3. An apparatus as claimed in claim 2, said linking means comprising a mechanical link pivoted within said body, means joining one end of said link to said holder free end, and wire means joining the other end of said link to said cam means.

4. An apparatus as claimed in claim 2, said linking means comprising wire means connecting said holder free end to said cam means, said wire being laid over pin means mounted within said body.

5. An apparatus as claimed in claim 1, said clamper means including movable portions and a fixed portion, said movable portions being biased toward a position away from said disc, and being engageable with said cam means for slidable movement relative to said fixed portion toward and in engagement with said disc.

6. An apparatus as claimed in claim 5, said disc setting base being mounted to a motor for rotating said disc, a portion of said movable portion of said clamper means being rotatable with said disc with respect to remaining portions of said clamper means.

* * * * *